UNITED STATES PATENT OFFICE.

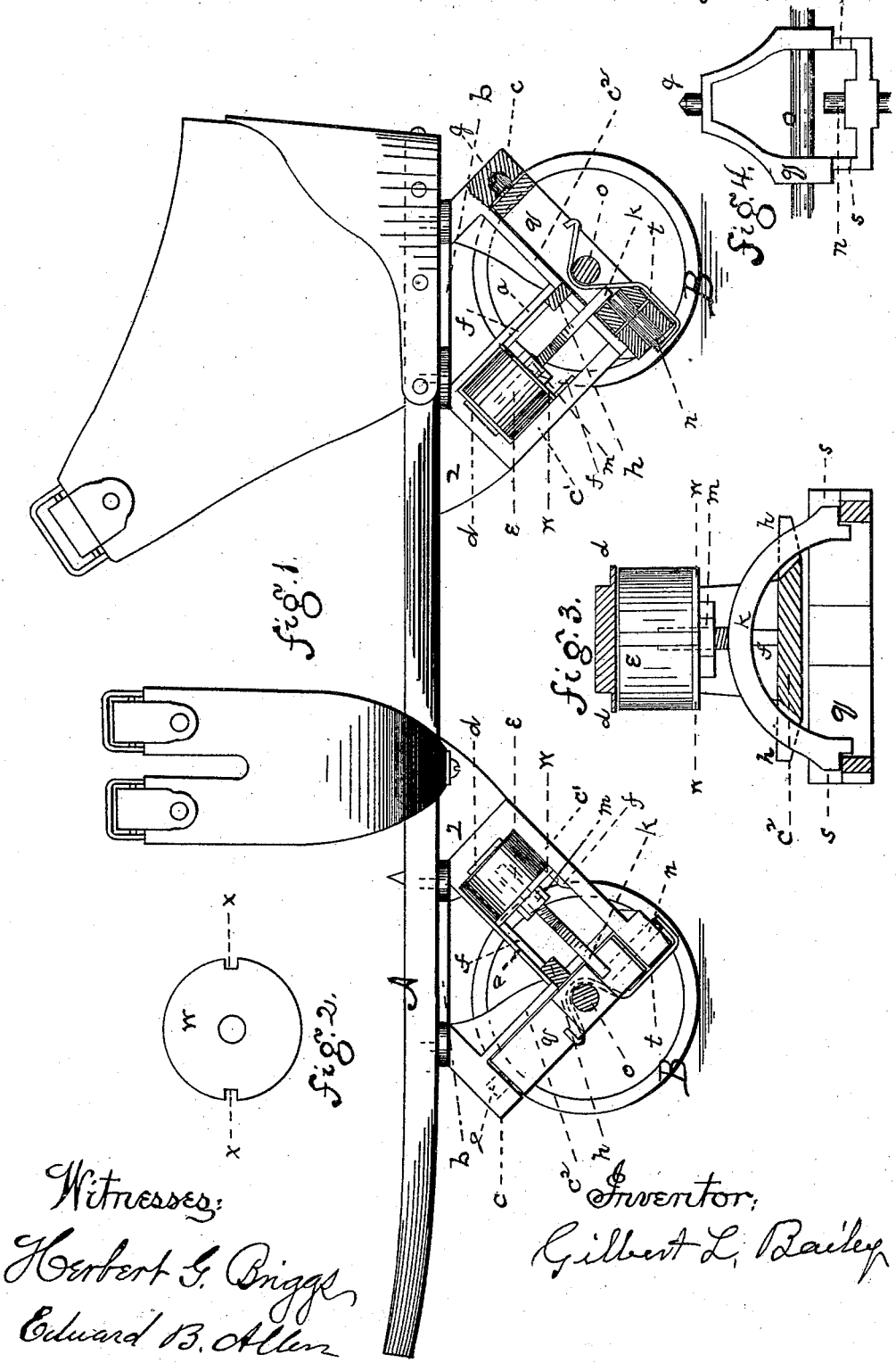

GILBERT L. BAILEY, OF PORTLAND, MAINE.

ROLLER-SKATE.

SPECIFICATION forming part of Letters Patent No. 298,721, dated May 20, 1884.

Application filed February 18, 1884. (No model.)

*To all whom it may concern:*

Be it known that I, GILBERT L. BAILEY, a citizen of the United States, residing at Portland, in the county of Cumberland and State of Maine, have invented a new and useful Improvement in Roller-Skates, of which the following is a specification.

My invention relates to an improvement in that class of roller-skates in which the foot-piece has a sidewise rocking or tilting motion, and wherein rubber springs are used to hold the roller carrier and axle in a position transversely parallel with the bottom of the foot-piece when at rest or running in a direct line, and to graduate the additional pressure put upon them in turning curves. Heretofore these springs have been applied in such a manner that when not in use they are necessarily under severe pressure, and the additional pressure put upon them in turning curves acts only upon one part of the rubber at one time, which conditions conduce to render them useless in a very short time. Again, the axles on which the rollers turn, the bearings of the roller-carrier, and the bearing-point of the spring on said carrier have heretofore been placed on different planes, which is inconsistent with the correct action of the parts.

The objects of my invention are, first, to provide a rubber spring for a roller-skate that will be subject to but slight pressure when at rest, and when in use be compressed bodily or over its whole surface by the act of turning in either direction from a direct line; second, to insure the axle being held in a line transversely parallel with the foot-piece when at rest; third, to afford facilities for the proper adjustment of the pressure of the springs; fourth, to provide a roller carrier and axle with bearings whose longitudinal centers and the point of resistance between the carrier and spring, respectively, shall be on the same plane; and, fifth, to afford facilities for readily disconnecting the roller-carrier and hanger. I attain these objects by the mechanism illustrated in the accompanying drawings, in which—

Figure 1 is a side view of the foot-piece of a skate with two rollers removed, showing my improvement. Fig. 2 is a plan view of a follower. Fig. 3 is a sectional view, showing a rubber spring, yoke, and roller-carrier. Fig. 4 is a plan view of a roller-carrier with the axle in its bearings.

Similar letters and figures refer to similar parts throughout the several views.

Plate $b$ of the hanger is fastened to the bottom of foot-piece A, and has two parallel arms, $c$ $c'$, projecting downward, longitudinally inclined with respect to the foot-piece, one being shorter than the other. The roller-carrier $q$, which is an irregular shaped frame, the construction and form of which are plainly shown in Fig. 4, receives the axle $o$, on which rollers B B are mounted transversely through the thicker portions of its sides, and is pivoted to arms $c$ $c'$ at their lower ends. Pivot $g$, which is made integral with the carrier, has its bearing in the short arm $c$, and a pin, $n$, connects the other end to the long arm $c'$. Pin $n$ is kept from accidental displacement by spring-guard $t$, and can be easily removed when necessary. On these bearings foot-piece A is tilted, and is limited in its action by a stop, $h$, that projects laterally from each side of bar $c^2$, above carrier $q$, against the upper side of which it strikes. A cylindrical rubber spring, E, is placed in its seat $d$. The upper portion of yoke $k$ carries a screw-thread and nut $m$, and penetrates the rubber spring a short distance through a central opening in follower W, the latter being placed above and held in contact with the spring by the nut $m$. The lower arms of yoke $k$ straddle bar $c^2$, and have shoulders at their ends which rest in notches S S cut in each side of the roller-carrier frame $q$. This completes the connection between the carrier and spring, the pressure of the latter being thereby transmitted to the former. Guides $f f$ work through notches $x$ $x$ of follower W when the spring is compressed, thus holding yoke $k$ and spring E in a line perpendicular to the face of spring-seat $d$, and causing the compression of the spring to be equal over its whole surface. The tension of spring E may be adjusted by turning nut $m$. A thin plate or web, 2, rises from the upper side of spring-seat $d$, which may be made the central bearing of a right and left threaded screw when clamps are used to hold the skate to the foot; but may be dispensed with when straps are used. The longitudinal centers of axle $o$, carrier-bearings $n$ and $g$, and the bottom of notches S S are all fixed on the same plane, thus insuring that ease of action unattainable by any other arrangement of the parts. When the skater is in an upright position the pressure of the spring through the medium of yoke k is exerted equally upon the outer portions of the carrier on either side of the center of oscillation, whereby the axle o is held transversely parallel with the bottom of the foot-piece. The longitudinal inclination of the roller-carrier q in this case is greater than that ordinarily adopted in roller-skates, by reason of which there is more resistance to the tilting of the foot-piece in the mechanism itself, and so requires less resistance on the part of the rubber spring when the foot-piece is tilted.

I do not wish to be understood as limiting myself to the exact form of roller-carrier above described, as I am aware that it may be made in other forms embracing the same features of action.

Its operation is as follows: When the foot-piece A is tilted to one side to turn a curve the distance between spring-seat d and the bearing of yoke k on that side of carrier q is shortened, and as the yoke cannot move from its relative position, it follows that spring E will be compressed between its seat and follower W. By this movement (the tilting of the foot-piece to one side) the opposite arm of yoke k is raised from its bearing, and as the foot-piece is righted the spring recoils, and it (the arm) is carried back to its place. To hold it in this position but slight pressure of the spring is required by reason of the distance between its points of bearing on carrier q, both ends resting thereon. Substantially the same results might be obtained by reversing the operation of the parts between the spring and carrier, placing the bearing of the yoke on the lower side of the carrier and passing the upper end of yoke k through the spring, with the follower and nut acting on the upper and the seat at the lower end of the same; but I prefer the arrangement herein shown.

The particular description of some parts, such as are common to other roller-skates, has been omitted here, as being unnecessary.

I am aware that the foot-piece of a roller-skate has been arranged to have an elastic rocking motion, and I make no claim to such motion. I am also aware of the invention of Freeman and Carkeet, No. 106,045, August 2, 1870, and of W. H. Bliss, patented July 19, 1881, No. 244,372, and I do not claim any part of their inventions; but, Having described my invention, what I claim is—

1. In a roller-skate, the combination of plate b, fastened to foot-piece A, arms c c', longitudinally-inclined frame, roller-carrier q, carrying axle o, having rollers mounted thereon, pivoted thereto, bar $c^2$, having stops h h projecting laterally therefrom above said roller-carrier and adapted to strike upon the upper portion thereof, and graduating-spring E, acting thereon through the intermediate yoke, k, substantially as shown and described.

2. In a roller-skate, a carrier consisting of frame q, substantially as shown, adapted to be pivoted to the arms of a hanger and having notches cut in its sides opposite each other, in combination with an axle upon which rollers are mounted, transversely supported thereon in such a position that its longitudinal center, the pivotal center of said carrier, and the bottom of said notches will be upon the same plane, substantially as and for the purpose herein set forth.

3. In a roller-skate having a swiveling roller-carrier, a spring acting on said carrier through an intermediate yoke adapted to bear upon each side of its center of oscillation, said yoke having an adjustable screw-threaded nut and being held in its proper line of travel by a notched follower working on guides against said spring, substantially as and for the purpose herein set forth.

4. In a roller-skate, plate b, fastened to foot-piece A, arms c c', roller-carrier q, supporting-axle o, having rollers mounted thereon and swiveled to said arms, spring-seat d, spring E, notched follower W in contact with said spring, guides f f, and yoke k, carrying screw-threaded nut m, combined and operating substantially as herein described.

GILBERT L. BAILEY.

Witnesses:
M. A. BLANCHARD,
WILLIAM E. KNIGHT.